United States Patent [19]
Gillingham et al.

[11] Patent Number: 6,023,385
[45] Date of Patent: *Feb. 8, 2000

[54] TAPE SERVO PATTERN WITH ENHANCED SYNCHRONIZATION PROPERTIES

[75] Inventors: Ronald Dean Gillingham, Longmont; Steven Gregory Trabert; John Paul Mantey, both of Boulder, all of Colo.

[73] Assignee: Storage Technology Corporation, Louisville, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/804,445

[22] Filed: Feb. 21, 1997

[51] Int. Cl.[7] .............................. G11B 5/09; G11B 5/584
[52] U.S. Cl. .......................................... 360/48; 360/77.12
[58] Field of Search .................. 360/48, 77.01, 360/77.12, 27, 72.1

[56] References Cited

U.S. PATENT DOCUMENTS

| | | | |
|---|---|---|---|
| 4,462,053 | 7/1984 | Lum et al. | 360/78 |
| 4,472,750 | 9/1984 | Klumpp et al. | 360/78 |
| 4,498,129 | 2/1985 | Velazquez | 364/174 |
| 4,586,094 | 4/1986 | Chambors et al. | 360/77 |
| 4,646,175 | 2/1987 | Sokolik et al. | 360/78 |
| 4,843,493 | 6/1989 | Furuhata et al. | 360/18 |
| 4,996,609 | 2/1991 | Joannou | 360/57 |
| 5,229,895 | 7/1993 | Schwarz et al. | 360/77.12 |
| 5,384,669 | 1/1995 | Dunn et al. | 360/48 |
| 5,386,324 | 1/1995 | Fry et al. | 360/53 |
| 5,394,280 | 2/1995 | Chliwyj et al. | 360/77.12 |
| 5,396,376 | 3/1995 | Chambors et al. | 360/48 |
| 5,408,366 | 4/1995 | Bentley et al. | 360/53 |
| 5,426,543 | 6/1995 | Dy et al. | 360/77.01 |

OTHER PUBLICATIONS

Timing based track following servo for Magnetic Tape; Barrett, Albrecht, Eaton; IEEE; Jul. 1996.

Design of a Disk File Head Positioning Servo; R K Oswald; IBM J. Res. Develop.; Nov. 1974.

*Primary Examiner*—Aristotelis M. Psitos
*Assistant Examiner*—Regina Y. Neal
*Attorney, Agent, or Firm*—Brooks & Kushman P.C.

[57] ABSTRACT

A magnetic tape servo pattern with different frequency signals to define the frame boundary. A significantly different frequency field is used to signal the transition from one frame to the next.

1 Claim, 3 Drawing Sheets

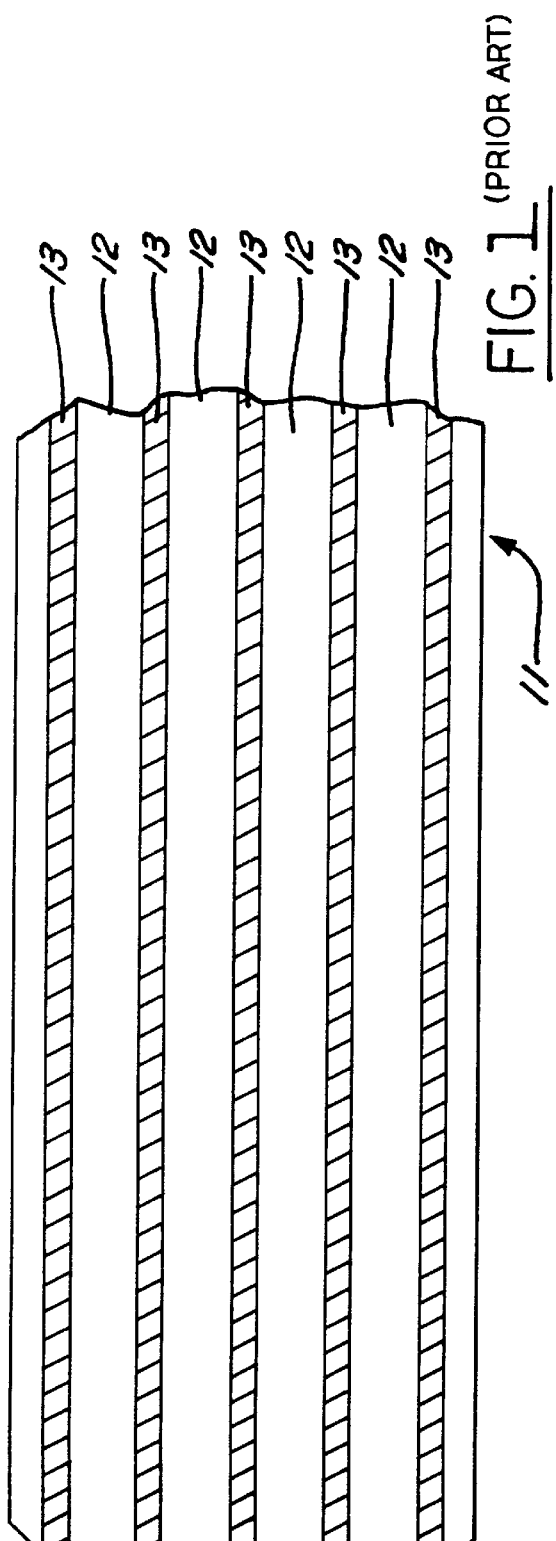
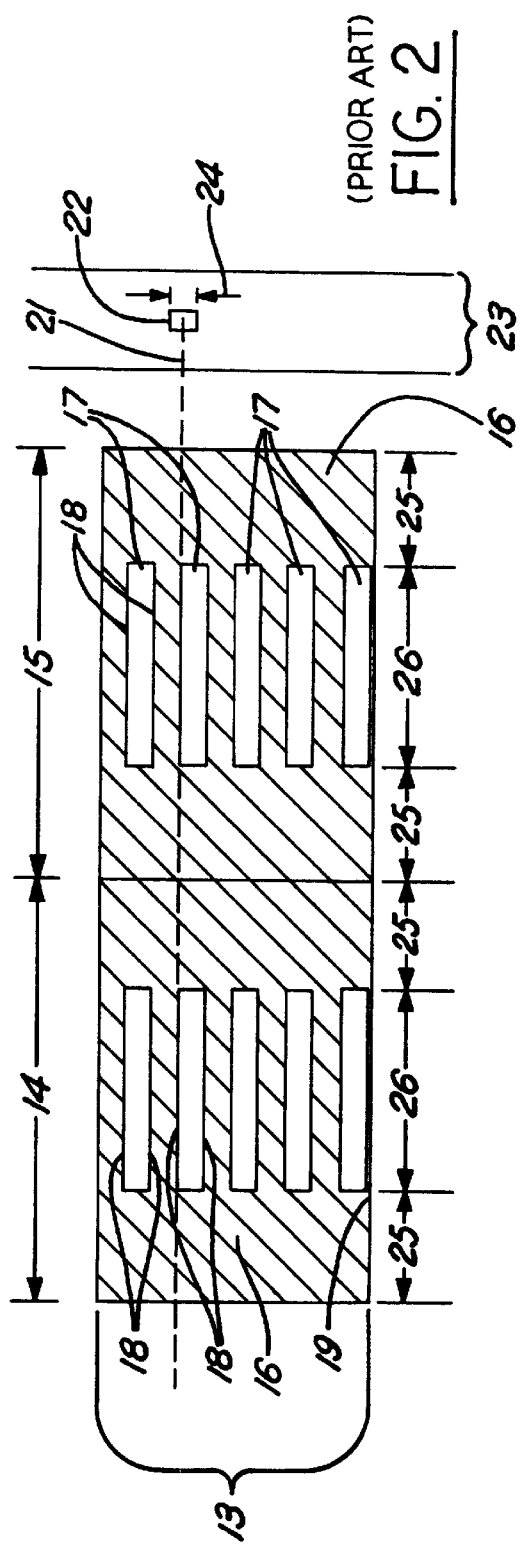
FIG. 1 (PRIOR ART)
FIG. 2 (PRIOR ART)

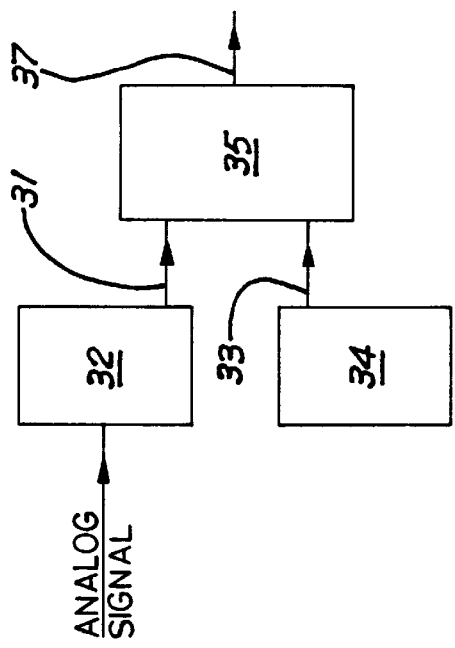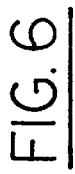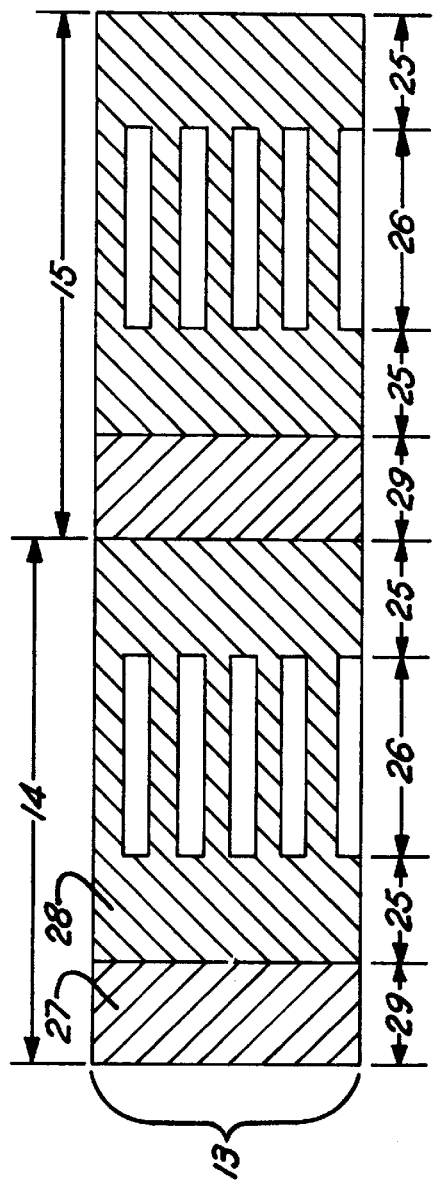

TAPE SERVO PATTERN WITH ENHANCED SYNCHRONIZATION PROPERTIES

BACKGROUND OF THE INVENTION

1. Field of the Invention

The invention relates to the field of dynamic magnetic information storage or retrieval. More particularly, the invention relates to the field of automatic control of a recorder mechanism. In still greater particularity, the invention relates to track centering using a servo pattern. By way of further characterization, but not by way of limitation thereto, the invention is a unique servo pattern with enhanced synchronization properties.

2. Description of the Related Art

Magnetic tape recording has been utilized for many years to record voice and data information. For information storage and retrieval, magnetic tape has proven especially reliable, cost efficient and easy to use. In an effort to make magnetic tape even more useful and cost effective, there have been attempts to store more information per given width and length of tape. This has generally been accomplished by including more data tracks on a given width of tape. While allowing more data to be stored, this increase in the number of data tracks results in those tracks being more densely packed onto the tape. As the data tracks are more closely spaced, precise positioning of the tape with respect to the tape head becomes more critical as errors may be more easily introduced into the reading or writing of data. The tape—tape head positioning may be affected by variations in the tape or tape head, tape movement caused by air flow, temperature, humidity, tape shrinkage, and other factors, especially at the outside edges of the tape.

In order to increase data track accuracy, servo stripes have been employed to provide a reference point to maintain correct positioning of the tape with respect to the tape head. One or more servo stripes may be used depending upon the number of data tracks which are placed upon the tape. The sensed signal from the servo stripes is fed to a control system which moves the head and keeps the servo signal at nominal magnitude. The nominal signal occurs when the servo read gap is located in a certain position relative to the servo stripes. Referring to FIG. 1, a one-half inch wide length of magnetic tape 11 may contain up to 288 or more data tracks on multiple data bands 12. With such a large number of data tracks it may be desirable to include up to five or more servo stripes 13 to improve data read and write function performance. Servo stripes 13 may utilize various patterns or frequency regions to allow precise tape to tape head positioning thus allowing a data read head to more accurately read data from data bands 12.

Referring to FIG. 2, a portion of a conventional servo stripe 13 is shown having two frames 14 and 15. A first frequency signal 16 is written across the width of servo stripe 13. As is known in the art, an erase frequency is written over first frequency signal 16 in a predetermined pattern such as five rectangles 17 in each of frames 14 and 15. The five rectangles 17 in each frame result in nine horizontal interfaces 18 between frequency signal 16 and erase patterns 17 as the tenth edge 19 along the bottom is ignored. A dashed line 21 illustrates the alignment of a read gap 22 in a tape read head 23.

Referring to FIG. 2, if the alignment of read gap 22 with servo pattern 13 is as shown, dotted line 21 passes along one of edges 18 and through the center of gap 22. If the servo pattern on the tape is passed right to left over gap 22, then read gap 22 will alternate between reading frequency 16 across the full width 24 of gap 22 in areas 25 and frequency 16 across one half of read gap 22 and an erase frequency from patterns 17 across the other half of width 24 in areas 26.

FIG. 3 shows the read frequency signals from one frame 14 or 15 as read by head gap 22 in FIG. 2. The amplitude of the signal is larger in areas 25 where frequency area 16 passes over the full width 24 of head gap 22. The amplitude of the signal is about half as large in area 26 when one half of width 24 reads frequency area 16 and the other half reads erase patterns 17. The servo control system in a tape drive uses the ratio of the full signal amplitude in field 25 to the half signal amplitude in field 26 to stay on track. For the on track position shown by dotted line 21 in FIG. 2 the ratio will be exactly one-half because one half of read gap width 24 is over area 16 and one-half is over erase pattern 17.

Referring to FIG. 1 and FIG. 2, if tape 11 and hence servo stripe 13 move down with respect to tape head 23, then, in field 26, more of area 16 and less of pattern 17 will be over head gap 22. Referring to FIG. 3, if more of area 16 is read, then the signal in field 26 will increase and this will be sensed by the controller. Conversely, if tape 11 and thus servo stripes 13 move up in FIGS. 1 and 2, then head gap 22 will see less of area 16 and more of pattern 17 across width 24. Thus, the signal in area 26 of FIG. 3 will decrease in amplitude proportionately to this movement. In this way the tape controller can sense the position of the tape 11 with respect to the read gap 22 and move head 23 to keep the head gap 22 aligned with the servo stripe along line 21. This alignment ensures precise reading of a data track in data bands 12 by the data read head (not shown). While this system can result in more precise positioning of the tape head 23 with respect to tape 11, a difficulty can arise in that the controller must be able to determine in which field, 25 or 26, it is in at the time the signal is read. That is, there must be synchronization between the time the signal in field 25 is sampled and the time the signal in field 26 is sampled.

Referring again to FIG. 3, the change in signal amplitude in moving to or from field 25 to or from field 26 could be used to determine in which field/area on the servo stripe read gap 22 is located. That is, if the signal drops to about one-half amplitude, it can be assumed that gap 22 is sensing movement from field 25 into field 26. Conversely, if the signal amplitude approximately doubles, it can be assumed that gap 22 is sensing tape movement into field 25 from field 26. However, this method is prone to error for a number of reasons. If head gap 22 is aligned such that it passes between erase patterns 17, only signal 16 will be read and there will be no amplitude change in the signal from areas 25 to areas 26 or vice versa. In effect the control system which positions the head with respect to the tape is lost. The tape controller system does not know whether gap 22 is in region 25 or 26. Another possible source of error is noise. Because the signals are analog and contain a significant amount of noise, it may be difficult to determine the change in amplitude as gap 22 senses movement from field 25 to field 26 and vice versa. It would be desirable to have a system in which the servo control circuitry could reliably determine in which region read gap 22 is then located.

SUMMARY OF THE INVENTION

The invention is a novel servo track pattern in which a synchronization frequency area is utilized as a transition area from one frame to another. A higher frequency in the synchronization signal area on the servo stripe is used as the transition area to define the frame boundaries. That is, the large frequency difference is used as the criterion to improve frame edge detection.

BRIEF DESCRIPTION OF THE DRAWINGS

FIG. 1 is an illustration of multiple servo stripes and data bands on magnetic tape;

FIG. 2 is an illustration of a servo pattern including multiple erase bands;

FIG. 3 is a graph of the analog signal generated from the servo pattern of FIG. 2;

FIG. 4 is an illustration of a servo pattern including a synchronization frequency area;

FIG. 6 is a block diagram of signal conversion and detection circuitry.

DESCRIPTION OF THE PREFERRED EMBODIMENT

Figure 5:
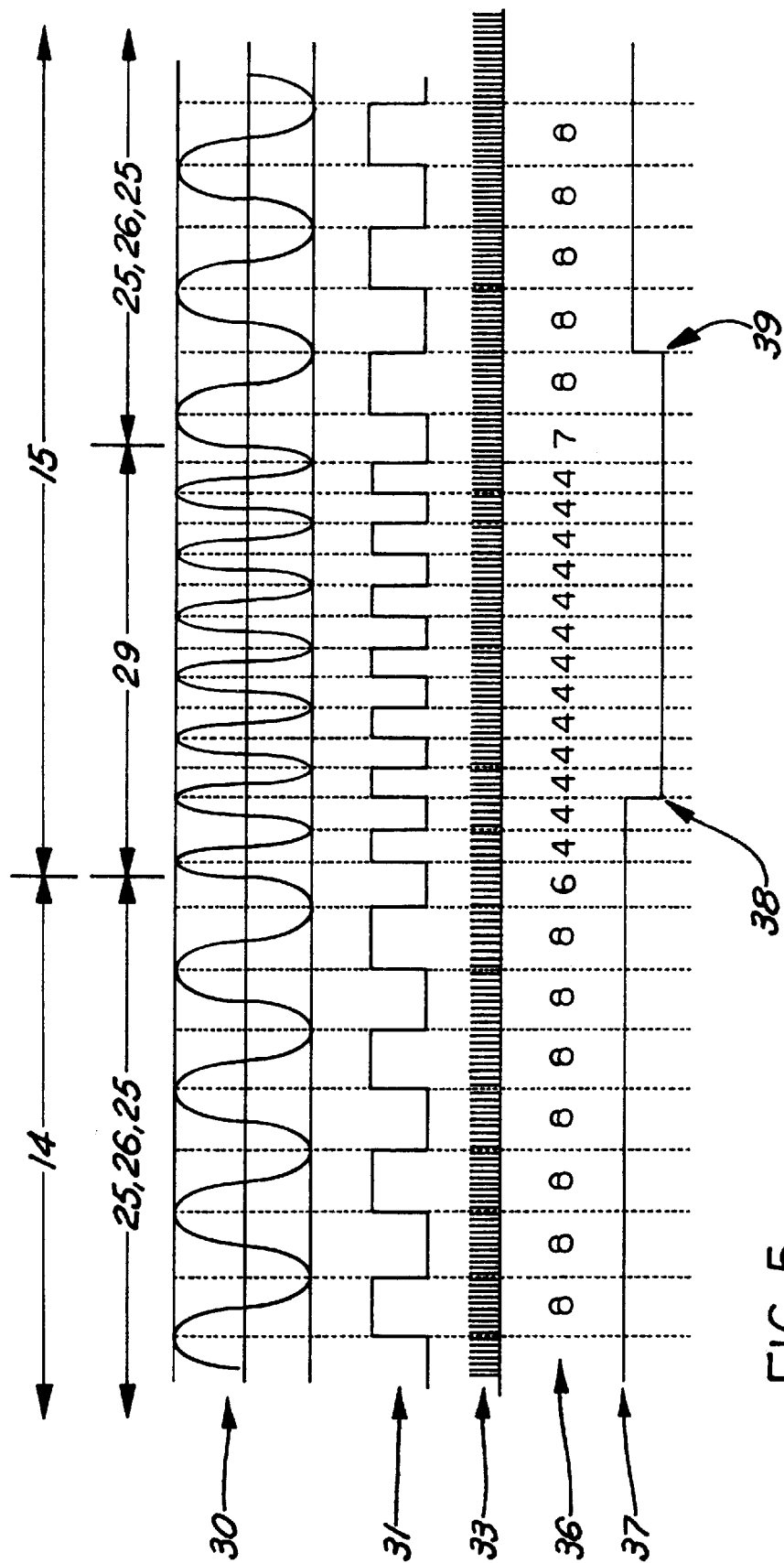
FIG. 5 is a graph of the analog signal generated from the servo pattern of FIG. 4 converted to a digital signal along with the clock pulses and the detection signal.

Referring to the drawings wherein like reference numerals denote like structure throughout each of the various drawings, FIG. 1 illustrates multiple servo stripes 13 written onto a given tape portion 11 to allow precise positioning of data bands 12 with respect to a data read head (not shown). FIG. 4 illustrates a servo pattern to be written as servo stripes 13 onto tape 11. Referring to FIG. 4, a synchronization frequency signal is written on a first area 27 across the width of servo stripe 13. A different frequency signal is written on a second area 28 across the width of servo stripes 13. First area 27 and second area 28 together comprise one frame 14. Synchronization frequency region 27 and servo modulation frequency area 28 are then alternately written onto servo stripe 13 in successive frames 15, etc. along a length of tape 11. As in FIG. 2, a third frequency signal, which may be, for example, an erase frequency signal, is written in a predetermined band pattern in each frame over second area 28. In the preferred embodiment, the erase frequency pattern is written in the form of parallelograms 17 which may take the form of a square or rectangle. During operation of the tape drive the location of the tape head relative to the tape is controlled by servo readers which monitor the output signal when the reader is positioned at the edge of erase bands 17 as was discussed above with respect to FIG. 2.

Referring to FIG. 4, fields 25 and 26 in frames 14 and 15 may be identical to those in FIG. 2. However, in accordance with the invention, the signal frequency in area 27 is approximately double that of second frequency area 28. Thus, referring to FIG. 5, the frequency in field 29 of an analog signal 30 sensed by the read gap 22 is approximately double the sensed frequency in adjacent fields 25/26/25. This frequency difference allows use of a criterion other than change in amplitude to detect the transition to or from a frame (e.g. frame 14 to frame 15 in FIG. 4). That is, the frequency change from field 29 to field 25/26/25 and vice versa enables frame edge detection which is less subject to noise and errors than a system such as shown in FIGS. 2 and 3 which relies on detecting the amplitude change in moving to or from fields 25 and 26.

Referring to FIGS. 5 and 6, the analog signal 30 in FIG. 5 is converted into a digital signal 31 by a data qualifier circuit 32 as used in data read channels. Data qualifier circuit 32 may be a zero crossing detector as is known to one skilled in the art. The half periods defined by each high and low pulse in digital signal 31 are proportional to the period of analog signal 30. The frequency of digital signal 31 in field 29 of FIG. 5 is different than the frequency of digital signal in fields 25, 26, 25 while the frequency of the signals in fields 25 and 26 is substantially identical. Because it is a digital signal, the amplitude differences between the pulses in fields 25 and 26 and 29 are not significant.

The detection of the frame edge in FIG. 5 is accomplished by the circuit shown in FIG. 6. A clock signal 33 from a crystal oscillator 34 is supplied to a counter 35 along with digital signal 31. Clock signal 33 is a very accurate high frequency signal. Counter 35 counts the number 36 of clock pulses 33 during each half period of digital signal 31. Because the period of the signal in field 29 is about half the period of the signals in fields 25 and 26, the counter will count half as many clock pulses during each half period of signal 31 in field 29 as during a half period of signal 31 in fields 25 or 26. For example, referring to FIG. 5, the number of clock signals 33 during each half period defined by a high or low pulse in signal 31 in field 29 is about 4 while the number of clock signals during each half period in fields 25, 26, 25 is about 8. Counter comparator logic 35 will generate a detection signal 37 in response to a change in count of clock pulses 33 in consecutive half periods of digital signal 31. That is, compare logic circuitry in counter 35 is used to compare the number 36 of clock pulses 33 which are counted during each half period defined by a high or low pulse in digital signal 31. For example, upon detecting the decrease in the number 36 of clock pulses 33 during each half period of signal 31 in moving from field 25 in frame 14 to field 29 of frame 15, counter 35 will generate a low detection signal at 38. Upon detecting an increase in count number 36 of clock pulses 33 for two successive half periods moving from field 29 in frame 15 to field 25 of frame 15, counter 35 will generate a high detection signal at 39. Thus, the use of a synchronization signal with a frequency measurably different from the frequency of the signal in the remaining portion of the frame allows more accurate detection of the frame edge.

As shown in FIG. 5, the transition in the number 36 of clock pulses 33 may not change from, for example, precisely 8 to 4 and back to 8 again. Uncertainty in these transition counts may be accounted for by delaying the detection signal one or more half periods of signal 31. In the preferred embodiment as shown in FIG. 5, detection signal 37 changes state (high to low or vice versa) after two successive half periods of a predetermined change in clock pulse counts 36 are detected. The predetermined change in count may be, for example, from two successive half periods with 6 or more counts to two successive half periods with 5 or less counts (at 38). Conversely, a change in count from two successive half periods to a count of 5 or less to two half periods with counts of 6 or more results in an output signal at 39. In the preferred embodiment, there is a delay in generating the detection signal 37 by comparing counts for two successive half periods such that the total delay is one period. This known delay may be accounted for by the controller in utilizing detection signal 37. The count frequency and the required number of counts to define a transition may be varied according to engineering design considerations as will be apparent to one skilled in the art. Likewise, while two half periods of frequency change are used in the preferred embodiment for redundancy/accuracy purposes, any number of half periods of change may be used in accordance with the invention.

While the invention has been described with respect to a particular embodiment thereof, it is not to be so limited as changes and modifications may be made which are within the full intended scope of the invention as defined by the appended claims. For example, while specific numbers of servo tracks and data tracks have been disclosed, the invention may be utilized with more or less servo or data tracks. While relative amplitudes and frequencies have been disclosed different ratios of these amplitudes and frequencies may be advantageously used without departing from the scope of the invention. Similarly, while particular tape servo patterns have been disclosed, more or less fields and different types of patterns may be employed without departing from the scope of the invention.

What is claimed is:

1. A method of reading a servo track on a tape having a given width and a given length, the tape having a series of longitudinal adjacent frames extending longitudinally along a part of the given length of the tape and laterally across a part of the given width of the tape, each of the frames having a given width and including first and second longitudinal adjacent portions each extending laterally across the given width of the frame, the first longitudinal adjacent portion having a first frequency signal and the second longitudinal adjacent portion having a second frequency signal, the second longitudinal adjacent portion further including a third frequency signal written onto a rectangular area over the second frequency signal, wherein the rectangular area defines a servo track extending longitudinally across the second longitudinal adjacent portion of a frame thereby separating top and bottom portions of the second longitudinal adjacent portion, wherein the first and second portions of adjacent frames are adjacent to one another, wherein the servo track extends longitudinally across the second longitudinal adjacent portion of the frames along the part of the given length of the tape, the method comprising:

moving the tape longitudinally across a tape head;

reading the servo track with a servo read element of the tape head as the tape moves longitudinally across the tape head, wherein the servo read element only reads the servo track; and detecting a transition along the servo track between adjacent frames from the change in frequency between the first and second frequency signals.

* * * * *